(12) United States Patent
Tian et al.

(10) Patent No.: US 10,457,612 B1
(45) Date of Patent: *Oct. 29, 2019

(54) SLAG BACTERIAL FERTILIZER AND PREPARATION METHOD THEREOF AND METHOD FOR IMPROVING DEGRADED SOIL

(71) Applicant: China University of Petroleum (East China), Qingdao (CN)

(72) Inventors: Yuanyu Tian, Qingdao (CN); Yingyun Qiao, Qingdao (CN); Kechang Xie, Qingdao (CN); Zhaohe Yang, Qingdao (CN); Meng Yuan, Qingdao (CN); Bo Wang, Qingdao (CN)

(73) Assignee: CHINA UNIVERSITY OF PETROLEUM (EAST CHINA), Qingdao (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/293,214

(22) Filed: Mar. 5, 2019

(30) Foreign Application Priority Data

Dec. 10, 2018 (CN) .......................... 2018 1 1503915

(51) Int. Cl.
- *C05F 11/08* (2006.01)
- *C05F 11/02* (2006.01)
- *B09C 1/10* (2006.01)

(52) U.S. Cl.
CPC ................. *C05F 11/08* (2013.01); *B09C 1/10* (2013.01); *C05F 11/02* (2013.01)

(58) Field of Classification Search
None
See application file for complete search history.

(56) References Cited

U.S. PATENT DOCUMENTS

| | | | | |
|---|---|---|---|---|
| 9,427,785 | B2 * | 8/2016 | Riddle | .................... G01N 33/24 |
| 10,259,025 | B2 * | 4/2019 | Li | ............... B09C 1/08 |
| 2018/0008853 | A1 * | 1/2018 | Shulgin | .................... B01J 20/24 |

FOREIGN PATENT DOCUMENTS

| | | | | |
|---|---|---|---|---|
| JP | 9-165312 | * | 6/1997 | .............. C05F 11/08 |
| JP | 9-227323 | * | 9/1997 | .............. C05F 11/08 |

* cited by examiner

*Primary Examiner* — Wayne A Langel
(74) *Attorney, Agent, or Firm* — Volpe and Koenig, P.C.

(57) ABSTRACT

Providing a slag bacterial fertilizer and preparation method thereof and a method for improving the degraded soil; the preparation method of the slag bacterial fertilizer, comprising: adding humic acid substance during a process of pulverizing the gasification slag and/or ash residue, wherein the weight ratio of the added amount of humic acid substance relative to the total heavy metal amount in the gasification slag and/or ash residue is 3-40:1; then aging the pulverized product for more than 24 hours; loading 1 to 20 parts by weight of the microbial bacterial fertilizer on the detoxified gasification slag and/or ash residue with respect to 100 parts by weight of the gasification slag and/or ash residue. The prepared slag bacteria fertilizer is used in combination with the humic acid substance to renovate the degraded soil with rapid renovation and desirable effect.

13 Claims, No Drawings

SLAG BACTERIAL FERTILIZER AND PREPARATION METHOD THEREOF AND METHOD FOR IMPROVING DEGRADED SOIL

CROSS REFERENCE TO RELATED APPLICATIONS

This application claims priority to Chinese Application No. 201811503915.9, filed on Dec. 10, 2018, entitled "Producing Soil Conditioner with Gasification Slag Modified by Humic Acid and Uses Thereof in Soil Improvement", which is specifically and entirely incorporated by reference.

FIELD OF THE INVENTION

The invention relates to resourceful treatment of inorganic solid wastes, especially relates to a harmless and resourceful treatment of gasification slag or ash residue, and particularly provides a slag bacterial fertilizer and preparation method thereof and a method for improving the degraded soil.

BACKGROUND OF THE INVENTION

For example, Shenhua Ningxia Coal Industry Group Company in Northwest China consumes about 37 million tons of coal annually, and has by-product gasification slag and ash residue of about 4.8 million tons (dry slag). However, a large amount of stockpiled gasification slag has to be buried and disposed by paying high expense resulting from the underdeveloped economy and the small scale of infrastructure in Ningxia Hui Autonomous Region, the used amount of building materials in the region is small, long-distance transportation is not cost-effective. On the one hand, the environmental protection benefits are poor, the coal group is required to pay a huge landfill fee of about 230 million yuan, it imposes a heavy burden on the enterprise; on the other hand, the rain leaching and filtrating (leaching, dissolving and infiltration) results in that the harmful elements in the slag are dissolved, when the harmful elements are infiltrate into the soil and absorbed by plants, it may contaminate surface water and underground water, thereby threat human health. Therefore, it is urgent to carry out research on the comprehensive utilization technology of gasification slag and ash residue, solve the difficult problem of large-scale resource utilization of gasification slag and ash residue, it is critical for the Shenhua Ningxia Coal Industry Group Company to gain both the environmental and economic benefits. The comprehensive utilization of gasification ash residue, which makes up a large share of solid wastes, is an important factor in achieving circular economy in the entire coal chemical project.

At present, in addition to the uses of pulverized coal ash in building materials, road construction, dam construction and an engineering backfill, the use of pulverized coal ash in agriculture have also been explored and researched at home and abroad; although the pulverized coal ash has been employed for improving soil during a long history, and a lot of achievements have been made, the use of pulverized coal ash is prone to cause adverse effects with different type and various degree because of the factors such as the imbalanced physical, chemical and biological properties of the pulverized coal ash. There are a large number of saline-alkali lands, desertified lands, and medium and low-yield fields in the Ningxia Hui Autonomous Region and surrounding areas in the northwest China, which requires a vast number of environmentally-friendly soil remediation ameliorant with high quality and low cost.

SUMMARY OF THE INVENTION

The purpose of the invention is to provide a slag bacterial fertilizer for overcoming the disadvantages of the existing resourceful treatment technology of gasification slag or ash residue. The method involves with using humic acid substance to passivate, adsorb, reduce, chelate and immobilize the harmful heavy metal elements such as Cr, As, Cd, Ni, Pb, Ba, Hg, Co, Se, Ag, Be in the gasification slag or ash residue, so as to perform detoxification of the gasification slag and/or ash residue; loading organic bacterial fertilizer on the detoxified gasification slag and ash residue to modified the detoxified gasification slag and ash residue thereby form the slag bacterial fertilizer. When the slag bacterial fertilizer is utilized for renovating the degraded soil, the fertilizer may continuously produce active humic acid substance, which can be used for improvement and renovation of the degraded soil; in addition, the combination of slag bacterial fertilizer and humic acid substance can achieve a combination of blood transfusion and blood production, thereby perform in-situ soil improvement and renovation in a permanent, sustainable and environmentally-friendly manner.

The inventors of the present invention have found in the research that the gasification slag and ash residue have the characteristics of low bulk density, high specific surface area and light weight, it can be used for modifying physical properties such as structure, bulk density, water retention capacity and particle composition of the soil, and providing a large number of nutrients and abundant trace elements (e.g., K, Ca, P, S, Mg, Mn, Mo, B, Na, Zn) which are indispensable for growth of plants, and can significantly improve soil nutrient status, thus the gasification slag and ash residue are potential soil ameliorant with high-quality and low cost. However, since the gasification slag and ash residue also contain trace harmful trace elements such as As, Cd, Cr, Ni, Pb, Ba, Hg, Co, Se, Ag, Be, when the gasification slag and ash residue are applied (in long term with large amount), the gradually accumulated contaminant elements may cause pollution of the soil, water and organisms, form the potential hazards to the biological chain, thereby restricting the application of the gasification slag and ash residue in renovation, improvement and modification of the agricultural soil. As the main component of humus, humic acid has a complicated chemical structure, it is a complex mixture containing active functional groups such as carboxyl, phenolic group, ketone, and phenolic hydroxyl group. It is the most important component of soil organic matter and the most important cementing agent of the soil aggregate structure. The fulvic acid with lower molecular weight has the functions of compatibilization and desorption, which is beneficial to the activation of heavy metals and can enhance absorption of various heavy metals by plants with enriched fulvic acid. The brown humic acid and black humic acid with large molecular weight have efficacies of ion exchange, chelation and adsorption, they are conducive to adsorption, reduction, passivation and fixation of the heavy metals, thereby decreasing mobility of the heavy metals.

As a result, in one aspect, the present invention provides a preparation method of a slag bacterial fertilizer, the preparation method comprising:

1) adding humic acid substance during a process of pulverizing gasification slag and/or ash residue, wherein the weight ratio of the amount of humic acid substance relative to the total heavy metal amount in the gasification slag and/or ash residue is 3-40:1, to perform in-situ reduction, passivation and immobilization of the heavy metals; aging the pulverized product for more than 24 hours after the pulverization process to prepare detoxified gasification slag and/or detoxified ash residue; wherein the mixing of gasification slag and/or ash residue with humic acid substance may be enhanced during a process of pulverizing; the heavy metals can sufficiently contact with the humic acid substance on the fresh interface generated in the pulverization process, so as to strengthen the in-situ reduction, complexation and immobilization; wherein the aging process can promote agglomeration of fine particles of the gasification slag and/or ash residue, and encapsulate and block the exudation and migration of heavy metal ions in the p articles.

2) loading 1 to 20 parts by weight of the microbial bacterial fertilizer on the detoxified gasification slag and/or detoxified ash residue with respect to 100 parts by weight of the gasification slag and/or ash residue, to obtain the slag bacterial fertilizer.

Preferably, the humic acid substance is one or more of humic acid, potassium humate, sodium humate and biomass pyrolysis oil; the biomass pyrolysis oil is prepared by pyrolyzing the agricultural and forestal wastes in a condition of absence of air under the temperature of 490-600° C. for a reaction time of 0.1-20 s.

Preferably, the pulverization is performed in a pulverizer selecting one of ball mill, cone crusher, toothed roller crusher, baffle crusher, impact crusher, hammer crusher, rotary crusher, and composite crusher, hydraulic crusher, deep cavity crusher, roll crusher, Simmons cone crusher, hydraulic cone crusher and jaw crusher.

Preferably, the microbial fertilizer comprises microbial thallus or microbial metabolites, the microbial thallus is at least one of *Bacillus, Saccharomyces cerevisiae, Aspergillus oryzae, Rhizobium, Azotobacteria* and *Phosphorus* bacteria; the metabolite is an active enzyme, which is one or more of a protease and a plant kinase.

Preferably, the pulverized gasification slag and/or ash residue have a particle diameter of 0.01-5 mm.

Preferably, the loading method comprising: uniformly mixing microbial bacterial fertilizer solution with the gasification slag and/or ash residue, and loading the microbial bacterial fertilizer on the gasification slag and/or ash residue.

In another aspect, the present invention provides a slag bacterial fertilizer produced with the aforementioned preparation method.

In a further aspect, the present invention provides a method for improving degraded soil comprising:

1) adding humic acid substance during a process of pulverizing gasification slag and/or ash residue, wherein the weight ratio of the amount of humic acid substance relative to the total heavy metal amount in the gasification slag and/or ash residue is 3-40:1, to perform in-situ reduction, passivation and immobilization of the heavy metals; aging the pulverized product for more than 24 hours after the pulverization process to prepare detoxified gasification slag and/or detoxified ash residue;

2) loading 1 to 20 parts by weight of the microbial bacterial fertilizer on the detoxified gasification slag and/or detoxified ash residue with respect to 100 parts by weight of the gasification slag and/or ash residue, to obtain the slag bacterial fertilizer;

3) applying the humic acid substance and the slag bacterial fertilizer on the surface of degraded soil uniformly.

Preferably, the degraded soil is one of saline-alkali land, desertificated land, heavy metal-contaminated land, and medium and low-yield field.

Preferably, the applying method comprising: relative per mu of the degraded soil, uniformly applying 10-350 kg of humic acid substance and 20-300 kg of slag bacterial fertilizer respectively on the surface of degraded soil, and pulverizing and mixing within the land surface at a depth of 100-300 mm by a rotary tiller, so as to form a water-stable granular structure having a particle diameter more than 0.25 mm.

The methods are implemented and tested according to the above scheme, it is demonstrated that the preparation method of slag bacterial fertilizer is reasonable, the operation is simple and safe, the production cost is low, the method can be used for performing in situ reduction, complexation, immobilization, and permanent encapsulation and blocking of heavy metals in the gasification slag and/or ash residue, eradicating the secondary pollution and rebound of the treatment. When the slag bacterial fertilizer is used for renovating degraded soil, the renovation is rapid with desirable effect; the renovated degraded soil can be used for normally growing trees and flowers and planting a variety of crops, the treated soil exhibits desirable gas permeability, and property of conserving soil moisture and fertilizer, the treatment cost is low, and the method may be applied in a wide range and produce improved economic and social benefits, thereby fulfill the predetermined purpose desirably.

Specifically, the humic acid substance is coupled with the gasification slag or ash residue to complement their advantages mutually and produce slag bacteria fertilizer; the humic acid substance can be used for adsorption, reduction, chelation, passivation and immobilization of the harmful heavy metal elements such as Cr, As, Cd, Ni, Pb, Ba, Hg, Co, Se, Ag, Be in the gasification slag or ash residue, thereby decrease migration and environmental hazard of the heavy metals; in addition, the microbial bacteria which is massively propagated in the renovated soil of the arable layer may continuously produce autogenic humic acid substance, further reduces the mobility of heavy metals and provides a sustainable detoxification effect of the humic acid. The gasification slag and ash residue have a porous honeycomb structure with a porosity up to 50%-80%, and possess high specific surface area and adsorptive activity, they are desirable carriers for applying biological humic acid substances, and may significantly increase the utilization rate of the humic acid substance and reduce its used amount; at the same time, the porous gasification slag or ash residue may act as the "blockhouse and multiplier" for the rapid propagation of beneficial bacteria, thereby enhancing the ecological competitiveness of the beneficial bacteria in the plough layer soil; furthermore, the combination of the humic acid substance and fine particles in the gasification slag or ash residue may increase the clay content in soil, thereby significantly increase a content of the water-stable granular structure having a particle diameter more than 0.25 in the soil, improve air permeability and capability of conserving moisture and fertilizer in the soil as well the content of organic matter, such that the water, fertilizer, air and heat in the soil tend to coordination for creating a desirable ecological environment in the soil for growing crops, restore the self-renovation capability of the soil, and solve the difficult problems concerning the polluted environment caused by stockpiling of solid wastes such as gasification slag and how to modify and renovate the soil in an environmentally-friendly manner, thereby perform the resourceful and comprehensive utilization of the gasification slag with high added-value.

DETAILED DESCRIPTION OF THE EMBODIMENTS

The features of the present invention will be described with reference to the examples.

The measurement of the total amount of heavy metals is performed according to the method specified in *DB43_T 1125-2016 Soil Remediation Standard for Heavy Metal Contaminated Sites.*

The biomass pyrolysis oil is obtained by a pyrolyzing corn stover in a condition of absence of air at a temperature of 550° C. for a reaction time of 10 seconds.

Example 1

In the first step, while the gasification slag is added into the cone crusher for pulverization, the sodium humate is added, and the weight ratio of the added amount of sodium humate to the total amount of heavy metal in the gasification slag is 20:1, and aging the mixture for 24 hours, then the detoxified gasification slag is obtained; wherein the particle diameter of the pulverized gasification slag is 0.5 mm or less.

In the second step, relative to 100 parts by weight of the gasification slag, mixing 5 parts by weight of the *Bacillus*-based microbial bacterial fertilizer solution with the detoxified gasification slag uniformly, loading the microbial bacterial fertilizer evenly on the detoxified gasification slag, then drying them under a low temperature of 35° C., thereby obtain the slag bacterial fertilizer.

In the third step, when the improvement and renovation of saline-alkali soil is conducted, 150 kg of sodium humate and 50 kg of slag bacterial fertilizer are uniformly applied on the surface of land having an area of 1 mu (i.e., 667 m²) respectively, and the land surface within a depth of 150 mm is smashed and mixed by a rotary tiller so as to form a large amount of water-stable granular structure having a particle diameter more than 0.25 mm.

When the paddy is planted on the renovated soil in the same year, the yield per mu is 650 kg, production rises by more than 90%.

Example 2

The improvement and renovation of saline-alkali soil is conducted according to the method of Example 1, the difference resides in that the sodium humate is replaced by an equivalent amount of biomass pyrolysis oil.

When the paddy is planted on the renovated soil in the same year, the yield per mu is 660 kg, production rises by more than 93%.

Comparative Example 1

The improvement and renovation of saline-alkali soil is conducted according to the method of Example 2, the difference resides in that the microbial bacterial fertilizer is added in the first step along with the biomass pyrolysis oil.

When the paddy is planted on the renovated soil in the same year, the yield per mu is 600 kg, production rises by more than 75%.

Comparative Example 2

The improvement and renovation of saline-alkali soil is conducted according to the method of Example 2, the difference resides in that the biomass pyrolysis oil is replaced by an equivalent amount of slag bacterial fertilizer during a process of renovating the soil.

When the paddy is planted on the renovated soil in the same year, the yield per mu is 400 kg, production rises by more than 17%.

Comparative Example 3

The improvement and renovation of saline-alkali soil is conducted according to the method of Example 2, the difference resides in that the biomass pyrolysis oil is added after pulverizing the gasification slag and then blending the mixture uniformly.

When the paddy is planted on the renovated soil in the same year, the yield per mu is 630 kg, production rises by more than 84%.

The invention claimed is:

1. A preparation method of a slag bacterial fertilizer, comprising:
   1) pulverizing gasification slag and/or ash residue and adding humic acid substance to the gasification slag and/or ash residue during the pulverizing, wherein the humic acid substance is one or more selected from the group consisting of humic acid, potassium humate, sodium humate and biomass pyrolysis oil and the weight ratio of the amount of humic acid substance relative to the total heavy metal amount in the gasification slag and/or ash residue is 3 to 40:1, to perform in-situ reduction, passivation and immobilization of the heavy metals; and aging the pulverized product for more than 24 hours after the pulverizing to prepare detoxified gasification slag and/or detoxified ash residue; and
   2) loading 1 to 20 parts by weight of a microbial bacterial fertilizer on the detoxified gasification slag and/or detoxified ash residue with respect to 100 parts by weight of the gasification slag and/or ash residue, to obtain the slag bacterial fertilizer.

2. The preparation method according to claim 1, wherein the pulverization is performed in a pulverizer selected from the group consisting of a ball mill, a cone crusher, a toothed roller crusher, a baffle crusher, an impact crusher, hammer crusher, a rotary crusher, a composite crusher, an hydraulic crusher, a deep cavity crusher, a roll crusher, a Simmons cone crusher, an hydraulic cone crusher and a jaw crusher.

3. The preparation method according to claim 1, wherein the microbial fertilizer comprises microbial thallus or microbial metabolites, the microbial thallus is at least one selected from the group consisting of *Bacillus, Saccharomyces cerevisiae, Aspergillus oryzae, Rhizobium, Azotobacteria* and *Phosphorus* bacteria; and the metabolite is an active enzyme, which is one or more selected from the group consisting of a protease and a plant kinase.

4. The preparation method according to claim 1, wherein the pulverized gasification slag and/or ash residue has a particle diameter of 0.01-5 mm.

5. The preparation method according to claim 1, wherein the loading method comprising: uniformly mixing microbial bacterial fertilizer solution with the gasification slag and/or ash residue, and loading the microbial bacterial fertilizer on the gasification slag and/or ash residue.

6. A slag bacterial fertilizer produced with the preparation method according to claim 1.

7. A method for improving degraded soil comprising:
   1) pulverizing gasification slag and/or ash residue and adding humic acid substance to the gasification slag and/or ash residue during the pulverizing, wherein the humic acid substance is one or more selected from the group consisting of humic acid, potassium humate, sodium humate and biomass pyrolysis oil and the weight ratio of the amount of humic acid substance relative to the total heavy metal amount in the gasification slag and/or ash residue is 3 to 40:1, to perform in-situ reduction, passivation and immobilization of the heavy metals; and aging the pulverized product for more than 24 hours after the pulverization process to prepare detoxified gasification slag and/or detoxified ash residue;

2) loading 1 to 20 parts by weight of a microbial bacterial fertilizer on the detoxified gasification slag and/or detoxified ash residue with respect to 100 parts by weight of the gasification slag and/or ash residue, to obtain a slag bacterial fertilizer; and 3) applying the slag bacterial fertilizer on the surface of degraded soil uniformly.

8. The method for improving degraded soil according to claim 7, wherein the pulverization is performed in a pulverizer selected from the group consisting of a ball mill, a cone crusher, a toothed roller crusher, a baffle crusher, an impact crusher, a hammer crusher, a rotary crusher, a composite crusher, an hydraulic crusher, a deep cavity crusher, a roll crusher, a Simmons cone crusher, an hydraulic cone crusher and a jaw crusher.

9. The method for improving degraded soil according to claim 7, wherein the microbial fertilizer comprises microbial thallus or microbial metabolites, the microbial thallus is at least one selected from the group consisting of *Bacillus, Saccharomyces cerevisiae, Aspergillus oryzae, Rhizobium, Azotobacteria* and *Phosphorus* bacteria; and the metabolite is an active enzyme, which is one or more selected from the group consisting of a protease and a plant kinase.

10. The method for improving degraded soil according to claim 7, wherein the pulverized gasification slag and/or ash residue has a particle diameter of 0.01-5 mm.

11. The method for improving degraded soil according to claim 7, wherein the loading method comprising: uniformly mixing microbial bacterial fertilizer solution with the gasification slag and/or ash residue, and loading the microbial bacterial fertilizer on the gasification slag and/or ash residue.

12. The method for improving degraded soil according to claim 7, wherein the degraded soil is one of saline-alkali land, desertificated land, heavy metal-contaminated land, and medium and low-yield field.

13. The method for improving degraded soil according to claim 7, wherein the applying method comprises: relative per mu of the degraded soil, uniformly applying 10-350 kg of humic acid substance and 20-300 kg of the slag bacterial fertilizer respectively on the surface of degraded soil, and pulverizing and mixing within the land surface at a depth of 100-300 mm by a rotary tiller, so as to form a water-stable granular structure having a particle diameter more than 0.25 mm.

* * * * *